(No Model.)

W. C. BEACH & A. A. BALDWIN.
Electric Galvanic Belt.

No. 240,499.          Patented April 26, 1881.

Attest:
J. C. Perkins
Jos. L. Ours

Inventors.
Willard C. Beach
Arthur A. Baldwin
By Lucius C. West
Atty.

N. PETERS, PHOTO-LITHOGRAPHER, WASHINGTON, D.C.

United States Patent Office.

WILLARD C. BEACH AND ARTHUR A. BALDWIN, OF GRAND RAPIDS, MICH.

ELECTRIC GALVANIC BELT.

SPECIFICATION forming part of Letters Patent No. 240,499, dated April 26, 1881.

Application filed December 30, 1880. (No model.)

*To all whom it may concern:*

Be it known that we, WILLARD C. BEACH and ARTHUR A. BALDWIN, of Grand Rapids, Michigan, have jointly invented new and useful Improvements in Electric Galvanic Belts, of which the following is a specification.

Our invention relates to electric belts which are worn about the body as a means of supplying the same with electricity as a curative agent, the battery of which consists of a number of connected links composed of zinc, copper, and absorbent fabric, or their equivalent materials, each link constituting a complete and perfect galvanic battery in itself.

Our invention has for its object certain improvements in the construction of the link-batteries, whereby an increase of the quantity and tension of the electric current is effected in equal proportions of electricity-producing elements in contrasting constructions, whereby the links are detachably connected and are prevented from drawing apart in the manufacture and use of them, as hereinafter explained.

Our object, also, is the construction of a belt in the use of which a greater surface of the body of the wearer forms the connecting electrode between the poles of the battery with no diminution of the power of the current.

A further object is the construction of an outer case for protecting the body from contact with the belt proper, and also to prevent the rapid evaporation of the generating-fluid.

The construction of a device embodying our improvements consists in several copper plates, each covered with cloth, felt, or other absorbent material capable of receiving and retaining a large quantity of generating-fluid. Around this fabric is wound first a ribbon of zinc, then a ribbon of flannel or other absorbent, the links then being detachably connected with each other and the whole incased in a cloth covering. A positive and negative pole of given constructions is provided at opposite ends of the battery portion of the belt, one of which is provided with a sponge. The outer case is made usually of webbing for the back face and velvet for the inner, or that portion coming in contact with the body of the wearer, said case being lined with rubber cloth or its equivalent. It is secured on the belt proper or battery by buttoning holes made in it over the poles of the belt and lacing it on the back face, as hereinafter explained.

Figure 1:
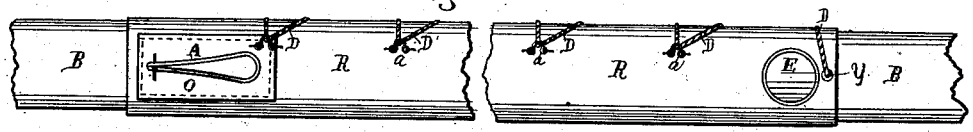
Figure 2:
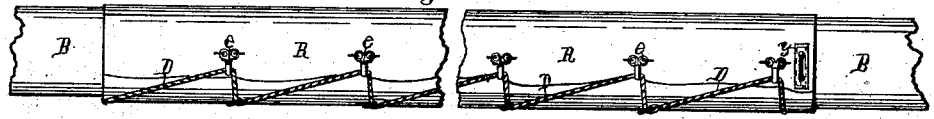
Figure 3:
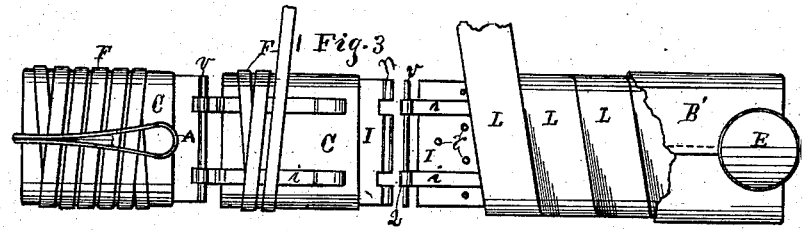
Figure 4:
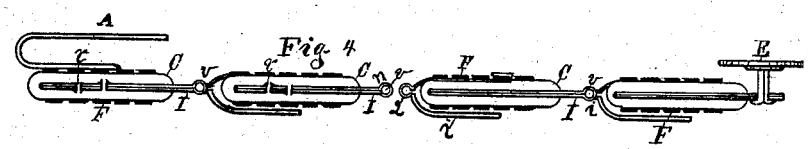
Figure 5:
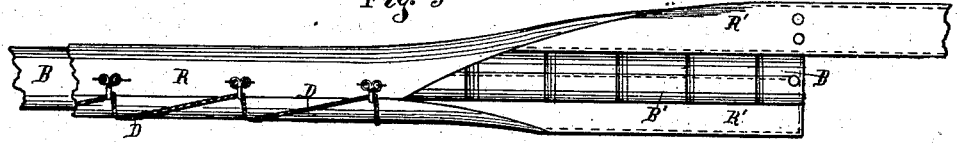
Figure 6:
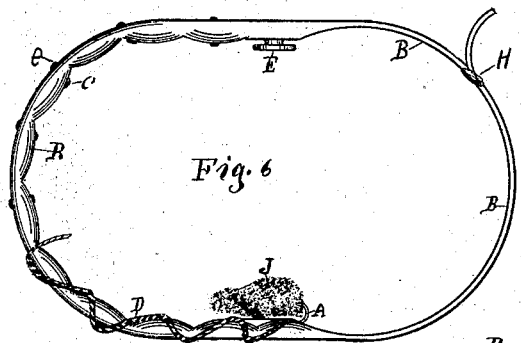

In the accompanying drawings, forming a part of this specification, Figure 1 shows an inside face view of the belt with its outer case; Fig. 2, back view of same; Fig. 3, the construction of the battery-links; Fig. 4, longitudinal section of same; Fig. 5, outer case partially unfastened, and Fig. 6 edge view of belt complete with sponge adjusted.

I I are the copper plates, having holes r r punched through the metal from opposite sides in a manner to cause rough projections to be formed on the faces of said plates, which engage with the absorbent covering C, preventing the plates I I from drawing out of the rest of the link in constructing the belt and in its use, Figs. 3 and 4.

F is the zinc ribbon wound about the link, as seen at left of Fig. 3.

In the construction of the hinge linking the batteries together, i is an elastic strip of metal or a wire bent back upon itself, one end of which is fastened under the zinc ribbon F on one face of the link and the other end loosely engaging it on the other face. At the point where the metal is bent eye 2 is formed in such a manner that plate I of one battery will not come in contact with the absorbent material C of the battery to which the former is hinged, and yet will allow the links to be disconnected by forcing them toward each other, when the free end of the elastic metal I will spring away, as shown in under face of Fig. 4, allowing the connecting-rod v to pass between it and the belt. This is of great advantage in adjusting belts to different-sized persons by detaching or adding batteries as required. The connecting-rod v of the hinge, when the hinging is effected, is located in an eye in plate I, made by rolling the edge of the metal over.

L L is the absorbent ribbon wound around the battery, and B' the cloth covering, which assists the absorbents C and L to longer retain the generating-fluid.

A negative pole, E, in the form of a flat plate, is secured to the plate I at one end of the battery portion of the belt, and a positive pole, A, is soldered to the zinc ribbon F of the opposite end. To the pole A is connected sponge J by cutting a hole in said sponge and inserting it over the pole, Fig. 6. The object of the sponge, which is used wet, is to protect the body from immediate contact with pole A; otherwise it would burn the flesh. The sponge, being wet, allows the electric fluid to be transmitted from the belt to the body.

R is the outer case, provided with rubber-cloth lining R' R', Fig. 5. A piece of rubber cloth, o, is also secured to the case R, under pole A, to prevent the fabric of said case from absorbing the moisture from the sponge. The lining R' R' also prevents the fabric of case R from absorbing moisture from cover B', thus always preserving that portion of the belt coming in contact with the body perfectly dry.

Lacer D is inserted through eyelet-holes $y\ y$ of case R, and fastened by tying a knot in the end of the lacer. It is then passed through eyes $a\ a$ secured to the inner face of case R. Hooks $e\ e$ are secured to the back face of said case, into which hooks the lacer D is caught, as shown in Figs. 1 and 2. Other modes of fastening the case R may be employed if preferable. The back portion of said case is extended beyond the battery portion of the belt, forming portions B B, which are provided with buckle H for securing the belt to the person.

In operating with the belt the battery portion is removed from case R and soaked in generating-fluid (vinegar preferred) until the absorbents C L and cover B' are thoroughly saturated. The presence and strength of the electric current can be ascertained by placing pole E on one side of the tongue and bringing pole A in contact with the other side, when the electricity will be felt if the belt contains sufficient generating-fluid. Then replace in case R and connect sponge J with pole A after moistening it in the generating-fluid. In adjusting to the body the sponge is located at or near the spinal column, in the small of the back, and the pole E on the upper bowels in front.

What we claim as new, and desire to secure by Letters Patent, is—

1. The electric galvanic belt, constructed of detachably-hinged plates having projections engaging the absorbent fabric covering said plates, and provided with the zinc ribbon, the whole being wound with fabric ribbon and covered with the fabric casing, said belt having the plate-pole secured to the link-plate of one end of the battery and the wire-pole soldered to the zinc ribbon of the other end, all substantially as described and shown.

2. A galvanic belt consisting of linked batteries, either end respectively of said belt being provided with a positive and a negative exposed electrode, said batteries being constructed of the link-plates, with their absorbent fabric, and wound with the zinc ribbon, all substantially as specified and shown.

3. The combination, with a pole of the belt bearing a sponge, of the outer case provided with the rubber protection-patch, substantially as described.

4. In an electric belt, a battery composed of the copper plate I, absorbent fabric C, and zinc ribbon F, wound around said plate, or their equivalent material, substantially as specified and shown.

WILLARD C. BEACH.
ARTHUR A. BALDWIN.

Witnesses:
B. F. ISBELL,
W. MACOMBER.